United States Patent
Kim et al.

(10) Patent No.: US 10,168,587 B2
(45) Date of Patent: Jan. 1, 2019

(54) DISPLAY DEVICE

(71) Applicant: Samsung Display Co., Ltd., Yongin, Gyeonggi-do (KR)

(72) Inventors: Dae Hyun Kim, Hwaseong-si (KR); Jae Woong Kang, Jeonju-si (KR); Jong Hyuk Kang, Suwon-si (KR); Jae Byung Park, Seoul (KR); Joo Yeol Lee, Seoul (KR); Hyun Deok Im, Seoul (KR); Hyun Min Cho, Seoul (KR); Sung Jin Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/070,950

(22) Filed: Mar. 15, 2016

(65) Prior Publication Data
US 2017/0017115 A1    Jan. 19, 2017

(30) Foreign Application Priority Data
Jul. 16, 2015   (KR) .......................... 10-2015-0100846

(51) Int. Cl.
*G02F 1/1343*   (2006.01)
*G02F 1/133*   (2006.01)
*G02F 1/1335*   (2006.01)

(52) U.S. Cl.
CPC ...... *G02F 1/13439* (2013.01); *G02F 1/13318* (2013.01); *G02F 2001/13324* (2013.01);
(Continued)

(58) Field of Classification Search
CPC ............ G02F 1/13439; G02F 1/13318; G02F 2001/133618; G02F 2001/13324;
(Continued)

(56) References Cited

U.S. PATENT DOCUMENTS

2009/0211633 A1*  8/2009  Schilinsky ............ H01L 27/302
                                              136/256
2009/0229667 A1*  9/2009  Shrotriya .............. H01L 51/445
                                              136/263
(Continued)

FOREIGN PATENT DOCUMENTS

KR         10-0683650           2/2007
KR    10-2007-0101814 A        10/2007
(Continued)

OTHER PUBLICATIONS

Park et al., ACSNANO, 2011, vol. 5, Photonic Color Filters Integrated with Organic Solar Cells for Energy Harvesting.
(Continued)

*Primary Examiner* — Angela Davison
*Assistant Examiner* — Mariam Qureshi
(74) *Attorney, Agent, or Firm* — Innovation Counsel LLP

(57) ABSTRACT

A display device comprises a first light-transmissive substrate, a second light-transmissive substrate and a solar cell disposed between the first and second light-transmissive substrates. The solar cell includes a conductive wire grid pattern layer, which is disposed between the first and second light-transmissive substrates, a transparent electrode, which is disposed between the second light-transmissive substrate and the conductive wire grid pattern layer, and at least one photoactive layer, which is disposed between the transparent electrode and the conductive wire grid pattern layer. The second light-transmissive substrate is configured to output an image therethrough.

7 Claims, 15 Drawing Sheets

(52) U.S. Cl.
CPC ............ *G02F 2001/133548* (2013.01); *G02F 2001/133618* (2013.01)

(58) Field of Classification Search
CPC ... G02F 2001/133548; G02F 1/133514; G02F 2001/133521; H01L 31/054; Y02E 10/50; G02B 5/28
See application file for complete search history.

(56) References Cited

U.S. PATENT DOCUMENTS

| | | | |
|---|---|---|---|
| 2011/0261455 A1* | 10/2011 | Sugita | G02B 5/3058 359/485.05 |
| 2011/0285942 A1* | 11/2011 | Guo | G02B 5/008 349/96 |
| 2012/0057106 A1* | 3/2012 | Park | G02F 1/133528 349/96 |
| 2012/0319222 A1* | 12/2012 | Ozawa | H01L 27/14605 257/432 |
| 2014/0191113 A1* | 7/2014 | Atwater | H01L 27/14621 250/208.1 |
| 2014/0327037 A1* | 11/2014 | Dussaigne | H01L 21/0237 257/103 |
| 2014/0354923 A1* | 12/2014 | Lee | G02F 1/133536 349/96 |
| 2016/0124555 A1 | 5/2016 | Hong et al. | |
| 2016/0147113 A1* | 5/2016 | Chang | G02F 1/133528 349/12 |
| 2016/0357064 A1* | 12/2016 | Nielson | G02B 5/3058 |

FOREIGN PATENT DOCUMENTS

| | | |
|---|---|---|
| KR | 10-2011-0018097 A | 2/2011 |
| KR | 10-2012-0055086 A | 5/2012 |
| KR | 10-2013-0118729 A | 10/2013 |
| KR | 10-2016-0052928 A | 5/2016 |
| KR | 10-2016-0067296 A | 6/2016 |

OTHER PUBLICATIONS

Zhu et al., Advanced Material, 2011, vol. 23, Polarizing Organic Photovoltaics.

* cited by examiner

DISPLAY DEVICE

This application claims priority to Korean Patent Application No. 10-2015-0100846 filed on Jul. 16, 2015 in the Korean Intellectual Property Office, the disclosure of which is incorporated herein by reference in its entirety.

BACKGROUND

1. Field of the Disclosure

The present disclosure relates to a display device.

2. Description of the Related Art

Display devices are devices that display an image by controlling the amount of light in units of pixels according to an image signal input thereto. Various research has been conducted on liquid crystal displays (LCDs), polymer dispersed LCDs (PDLCDs), organic light-emitting diode (OLED) displays, and the like.

As the screen size of display devices increases, it has become a technical goal to realize low power consumption in display devices. Also, as mobile devices, such as mobile phones, are widespread, it has become increasingly important to lengthen the driving time of mobile devices. Accordingly, a method that makes efficient use of limited energy in devices is needed.

SUMMARY

Exemplary embodiments of the present disclosure provide a display device having an energy-harvesting function and thus capable of realizing low power consumption.

However, exemplary embodiments of the present disclosure are not restricted to those set forth herein. The above and other exemplary embodiments of the present disclosure will become more apparent to one of ordinary skill in the art to which the present disclosure pertains by referencing the detailed description given below.

According to an exemplary embodiment of the present disclosure, a display device comprises a first light-transmissive substrate, a second light-transmissive substrate and a solar cell disposed between the first and second light-transmissive substrates. In the display device according to an exemplary embodiment of the present disclosure, the solar cell includes a conductive wire grid pattern layer, which is disposed between the first and second light-transmissive substrates, a transparent electrode, which is disposed between the second light-transmissive substrate and the conductive wire grid pattern layer, and at least one photoactive layer, which is disposed between the transparent electrode and the conductive wire grid pattern layer. In the display device according to an exemplary embodiment of the present disclosure, the second light-transmissive substrate is configured to output an image therethrough.

In the display device according to an exemplary embodiment of the present disclosure, the conductive wire grid pattern layer may include first partition walls, which are spaced from one another, may be configured to transmit a first polarized light therethrough while reflecting a second polarized light, which is perpendicular to the first polarized light, and may be electrically connected to the transparent electrode.

In the display device according to an exemplary embodiment of the present disclosure, the photoactive layer may be formed of a light-transmissive material and is a slit pattern-less layer.

In the display device according to an exemplary embodiment of the present disclosure, the photoactive layer may include second partition walls, which are spaced from one another, and may be disposed on the conductive wire grid pattern layer.

In the display device according to an exemplary embodiment of the present disclosure, the photoactive layer may transmit visible light therethrough and absorbs ultraviolet (UV) light and infrared (IR) light.

In the display device according to an exemplary embodiment of the present disclosure, the solar cell may include two or more photoactive layers and one or more recombination layers, which are disposed between the two or more photoactive layers.

In the display device according to an exemplary embodiment of the present disclosure, the solar cell may be a tandem polymer solar cell including two or more photoactive layers and one or more recombination layers, which are disposed between the two or more photoactive layers, the two or more photoactive layers may be photoactive pattern layers each including second partition walls, which are spaced from one another, the recombination layers may be recombination pattern layers each including third partition walls, which are spaced from one another, and the third partition walls may be disposed between the respective first partition walls and the respective second partition walls.

The display device according to an exemplary embodiment of the present disclosure may further comprise a liquid crystal layer disposed between the first light-transmissive substrate and the conductive wire grid pattern layer, a common electrode disposed between the conductive wire grid pattern layer and the liquid crystal layer and an overcoat layer disposed between the transparent electrode and the common electrode to fill gaps between the first partition walls, gaps between the second partition walls, and gaps between the third partition walls.

According to another exemplary embodiment of the present disclosure, a display device comprises a first light-transmissive substrate, a second light-transmissive substrate and a solar cell disposed between the first and second light-transmissive substrates. In the display device according to another exemplary embodiment of the present disclosure, the solar cell includes a conductive wire grid polarizer, which is disposed between the first and second light-transmissive substrates, a common electrode, which is disposed between the first light-transmissive substrate and the conductive wire grid polarizer, and at least one photoactive layer, which is disposed between the common electrode and the conductive wire grid polarizer. In the display device according to another exemplary embodiment of the present disclosure, the second light-transmissive substrate is configured to output an image therethrough.

In the display device according to another exemplary embodiment of the present disclosure, the conductive wire grid polarizer may include a conductive wire grid pattern layer having first partition walls, which are spaced from one another, and may be configured to transmit a first polarized light therethrough while reflecting a second polarized light, which is perpendicular to the first polarized light, and the conductive wire grid pattern layer may be electrically connected to the common electrode.

In the display device according to another exemplary embodiment of the present disclosure, the photoactive layer may be formed of a light-transmissive material and is a slit pattern-less layer.

In the display device according to another exemplary embodiment of the present disclosure, the photoactive layer may transmit visible light therethrough and absorbs UV light and IR light.

In the display device according to another exemplary embodiment of the present disclosure, the solar cell may be a tandem polymer solar cell including two or more photoactive layers and one or more recombination layers, which are disposed between the two or more photoactive layers.

According to further another exemplary embodiment of the present disclosure, a display device comprises a first light-transmissive substrate, a second light-transmissive substrate and a solar cell disposed between the first and second light-transmissive substrates. In the display device according to further another exemplary embodiment of the present disclosure, the solar cell includes a conductive wire grid polarizer, which is disposed between the first and second light-transmissive substrates, a surface plasmon color filter, which is disposed between the first light-transmissive substrate and the conductive wire grid polarizer, and at least one photoactive layer, which is disposed between the surface plasmon color filter and the conductive wire grid polarizer. In the display device according to further another exemplary embodiment of the present disclosure, the second light-transmissive substrate is configured to output an image therethrough.

In the display device according to further another exemplary embodiment of the present disclosure, the conductive wire grid polarizer may include a conductive wire grid pattern layer having first partition walls, which are spaced from one another, and may be configured to transmit a first polarized light therethrough while reflecting a second polarized light, which is perpendicular to the first polarized light, and the conductive wire grid pattern layer may be electrically connected to the surface plasmon color filter.

In the display device according to further another exemplary embodiment of the present disclosure, the photoactive layer may be formed of a light-transmissive material and may be a slit pattern-less layer.

In the display device according to further another exemplary embodiment of the present disclosure, the photoactive layer may transmit visible light therethrough and absorbs UV light and IR light.

In the display device according to further another exemplary embodiment of the present disclosure, the solar cell may be a tandem polymer solar cell including two or more photoactive layers and one or more recombination layers, which are disposed between the two or more photoactive layers.

In the display device according to further another exemplary embodiment of the present disclosure, the surface plasmon color filter may include hole array patterns and the hole array patterns include first holes, which may be configured to transmit light in a blue wavelength range therethrough, second holes, which are larger in size than the first holes and may be configured transmit light in a green wavelength range, and third holes, which are larger in size than the second holes and may be configured to transmit light in a red wavelength range.

The display device according to further another exemplary embodiment of the present disclosure, may further comprise a liquid crystal layer disposed between the first light-transmissive substrate and the surface plasmon color filter, a common electrode disposed between the surface plasmon color filter and the liquid crystal layer and an overcoat layer disposed between the photoactive layer and the common electrode to fill the first holes, the second holes, and the third holes.

According to exemplary embodiments of the present disclosure, it is possible to realize lower power consumption by converting external light into energy and using the energy.

In addition, it is possible to prevent the deterioration of a panel due to external light and the degradation of transmittance by absorbing and converting IR light and UV light into energy while allowing the transmission of visible light.

Other features and exemplary embodiments will be apparent from the following detailed description, the drawings, and the claims.

BRIEF DESCRIPTION OF THE DRAWINGS

A more complete appreciation of the present disclosure, and many of the attendant advantages thereof, will be readily apparent when the following detailed description is considered in conjunction with the accompanying drawings, in which like reference symbols indicate the same or similar components, wherein.

DETAILED DESCRIPTION OF THE EMBODIMENTS

Figure 1:
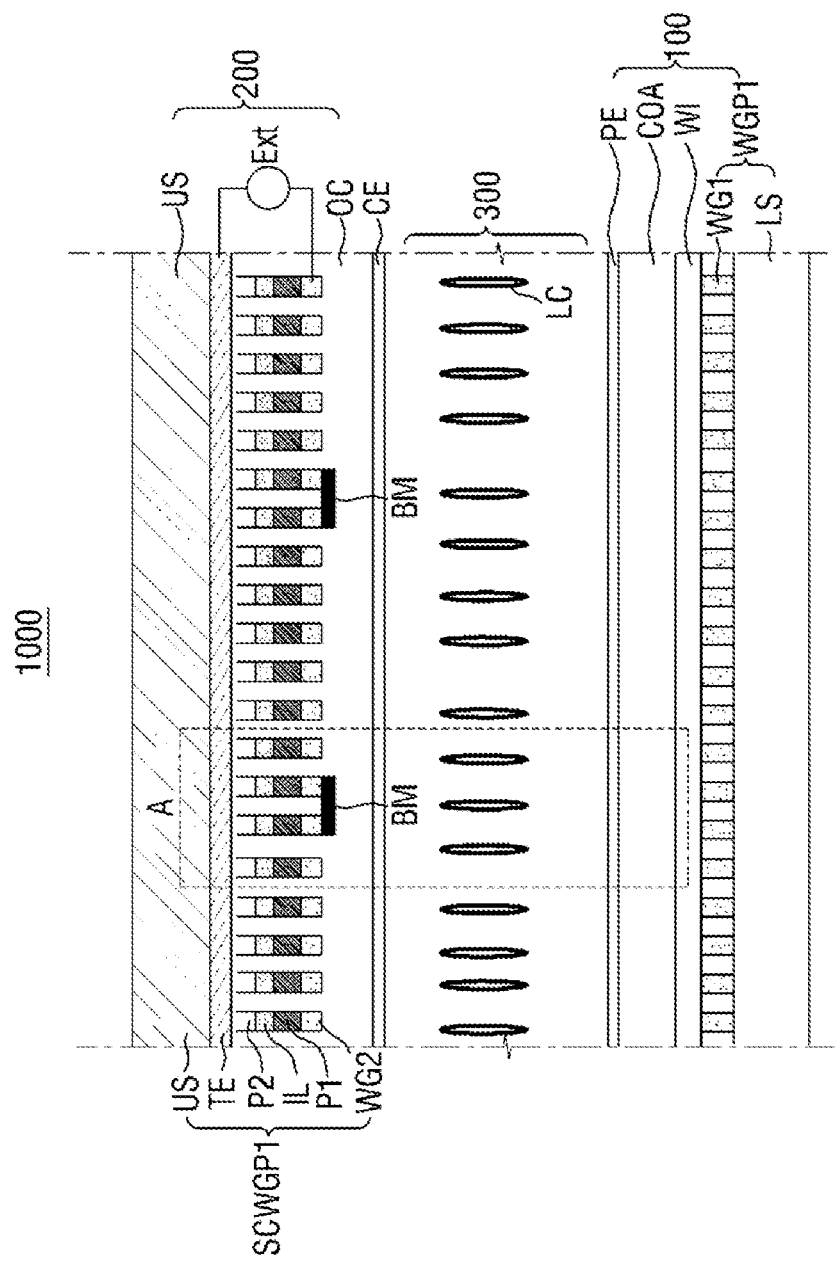
FIG. 1 is a schematic cross-sectional view of a display device according to a first exemplary embodiment of the present disclosure.

Features of the inventive concept and methods of accomplishing the same may be understood more readily by referencing the following detailed description of preferred embodiments and the accompanying drawings. The inventive concept may, however, be embodied in many different forms and are not limited to the embodiments set forth herein. Rather, these embodiments are provided to help illustrate the inventive concept to those of ordinary skill in the art.

In the drawings, the thickness of layers and regions are exaggerated for clarity. It will be understood that when an element or layer is referred to as being "on", "connected to" or "coupled to" another element or layer, the element or layer may be directly on, connected or coupled to another element or layer, or intervening elements or layers. In contrast, when an element is referred to as being "directly on", "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially related terms, such as "below", "lower", "under", "above", "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein may be interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, operations, elements, and/or components, but do not preclude the presence or addition of one or more other features, integers, steps, operations, elements, components, and/or groups thereof.

Exemplary embodiments of the present disclosure are described hereinafter with reference to the accompanying drawings.

FIG. 1 is a schematic cross-sectional view of a display device 1000 according to a first exemplary embodiment of the present disclosure. Referring to FIG. 1, the display device 1000 may include a first display substrate 100, a second display substrate 200, and a liquid crystal layer 300, which is disposed between the first display substrate 100 and the second display substrate 200.

The first display substrate 100 includes a first conductive wire grid polarizer WGP1, an insulating layer WI, a color filter-on-array layer COA, and a pixel electrode PE.

Figure 2:
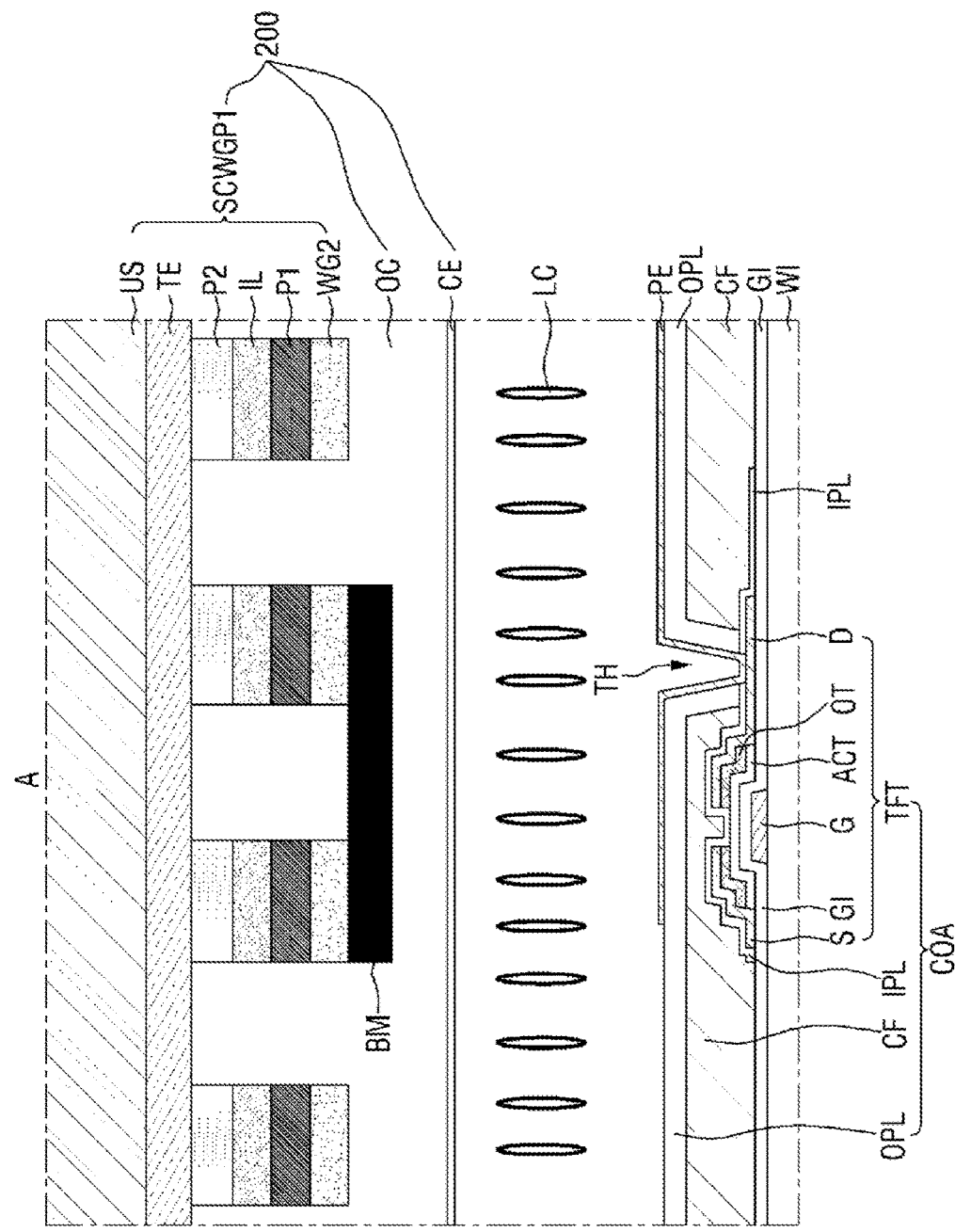
FIG. 2 is a schematic perspective view of a conductive wire grid polarizer used in the display device of FIG. 1.

FIG. 2 is a schematic perspective view of the first conductive wire grid polarizer WGP1 used in the display device 1000 of FIG. 1.

Referring to FIGS. 1 and 2, the first conductive wire grid polarizer WGP1 may include a first light-transmissive substrate LS and a first conductive wire grid pattern layer WG1.

The material of the first light-transmissive substrate LS may be appropriately selected, depending on the intended purpose of the first light-transmissive substrate LS or the type of processes that the first light-transmissive substrate LS is to be subjected to, as long as it allows the first light-transmissive substrate LS to transmit visible light therethrough. The first light-transmissive substrate LS may be formed using, for example, various polymer compounds such as glass, quartz, polyether sulfone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT or TAC), cellulose acetate propionate (CAP), and the like, but the present disclosure is not limited thereto.

The first conductive wire grid pattern layer WG1 may have a structure in which first partition walls are arranged at regular intervals on the first light-transmissive substrate LS, and may transmit first polarized light therethrough while reflecting second polarized light, which is perpendicular to the first polarized light. For example, the first partition walls have a line width of about 50 nm or less, a thickness of about 150 nm or more, and a pitch of about 100 nm or less, but the present disclosure is not limited thereto.

The first conductive wire grid pattern layer WG1 may be formed of a conductive material. For example, the first conductive wire grid pattern layer WG1 may be formed of a metal selected from among aluminum (Al), chromium (Cr), silver (Ag), copper (Cu), nickel (Ni), titanium (Ti), cobalt (Co), molybdenum (Mo) and an alloy thereof, but the present disclosure is not limited thereto.

The first conductive wire grid pattern layer WG1 may have a multilayer structure consisting of two or more layers. For example, the first conductive wire grid pattern layer WG1 may include a first layer (not illustrated) formed of Al and a second layer (not illustrated) formed of Ti or Mo, but the present disclosure is not limited thereto. If the first layer is formed of Al, hillocks may be generated at the top of the first layer depending on the temperature in a subsequent process. As a result, the top surface of the first layer may become irregular, and the optical properties of the display device 1000 may deteriorate. To address this problem, the second layer of Ti or Mo may be formed on the first layer to prevent the generation of hillocks.

Figure 3:
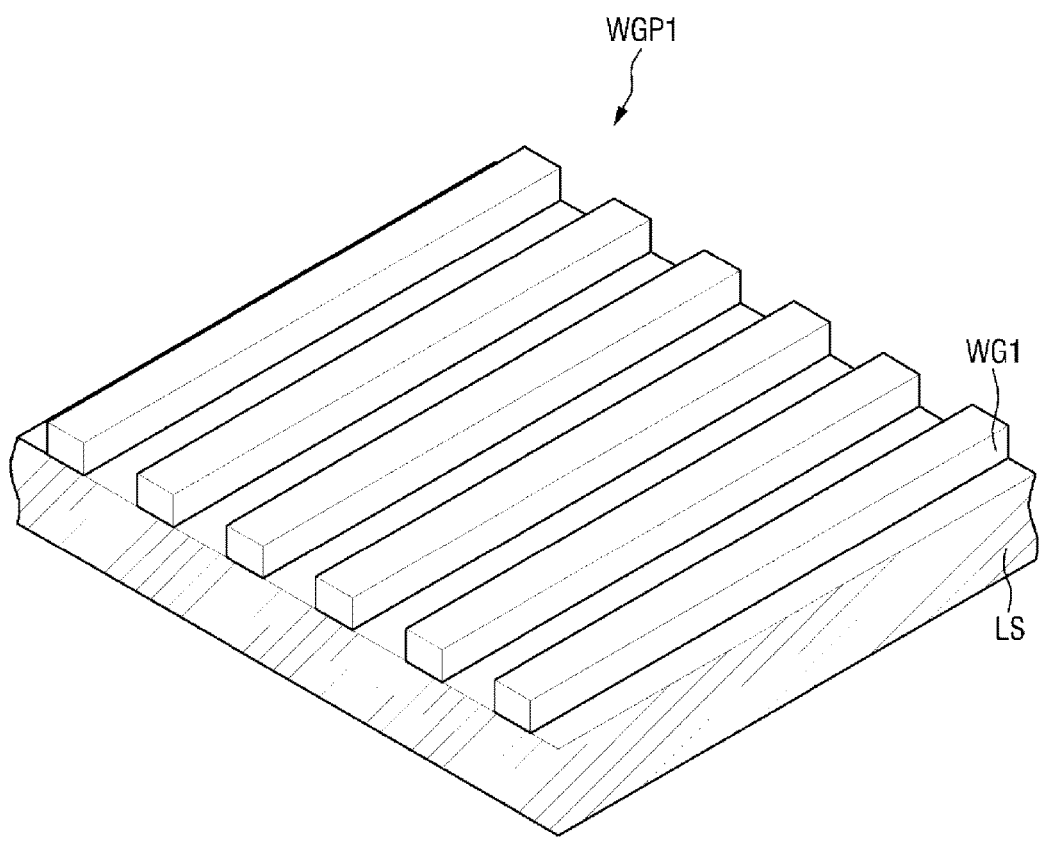
FIG. 3 is an enlarged view of area A of FIG. 1.

FIG. 3 is an enlarged view of area A of FIG. 1. The insulating layer WI may be disposed between the first conductive wire grid pattern layer WG1 and the color filter-on-array layer COA and may insulate the first conductive wire grid pattern layer WG1 and the color filter-on-array layer COA from each other.

Referring to FIG. 2, the COA layer COA may include a thin-film transistor TFT, a color filter layer CF, and an organic passivation layer OPL. The thin-film transistor TFT may be configured as follows.

A gate electrode G is disposed on the insulating layer WI, and a gate insulating layer GI is disposed on the gate electrode G. A semiconductor layer ACT is disposed on the gate insulating layer GI in the overlapping area of at least part of the gate insulating layer GI and the gate electrode G. Ohmic contact layers OT are disposed on the semiconductor layer ACT and are spaced from each other. A source electrode S and a drain electrode D are respectively disposed on the ohmic contact layers OT. An inorganic passivation layer IPL is disposed on the gate insulating layer GI, the source electrode S, the semiconductor layer ACT, and the drain electrode D, and the color filter layer CF is disposed on the inorganic passivation layer IPL. The organic passivation layer OPL may be disposed on the color filter layer CF, and the pixel electrode PE may be disposed on the organic passivation layer OPL. A contact hole TH may be formed through the color filter layer CF and the organic passivation layer OPL, and the pixel electrode PE may be electrically connected to the drain electrode D through the contact hole TH.

Referring to FIGS. 1 and 2, the pixel electrode PE, which is a field-generating electrode, may be disposed on the color filter-on-array layer COA. The pixel electrode PE may be formed of a transparent conductive oxide such as indium tin oxide (ITO) or indium zinc oxide (IZO).

Referring further to FIGS. 1 and 2, the second display substrate 200 may include a second light-transmissive substrate US, a first solar cell SCWGP1, an overcoat layer OC, a common electrode CE, and a black matrix BM.

The material of the second light-transmissive substrate US, like the material of the first light-transmissive substrate LS, may be appropriately selected, depending on the intended purpose of the second light-transmissive substrate US or the type of processes that the second light-transmissive substrate US is to be subjected to, as long as it allows the second light-transmissive substrate US to transmit visible light therethrough.

Figure 4:
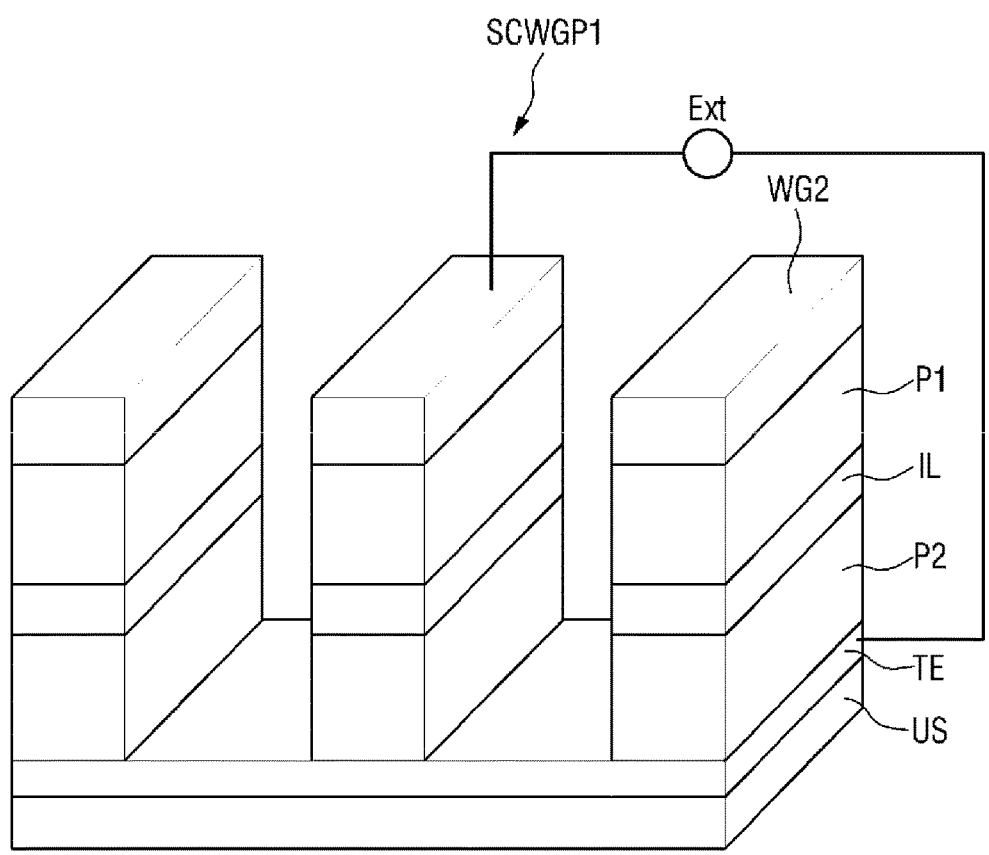
FIG. 4 is a schematic perspective view of a solar cell used in the display device of FIG. 1.

FIG. 4 is a schematic perspective view of the first solar cell SCWGP1 used in the display device 1000 of FIG. 1.

The first solar cell SCWGP1 may be one of an inorganic solar cell, an organic solar cell, and a hybrid solar cell. For example, the first solar cell SCWGP1 may be a tandem polymer solar cell, but the present disclosure is not limited thereto. The tandem polymer solar cell may include a first electrode, a second electrode, and at least two photoactive layers (i.e., first and second photoactive layers P1 and P2) disposed between the first and second electrodes, and at least one recombination layer IL disposed between the first and second photoactive layers P1 and P2.

Referring to FIGS. 1 and 4, the first electrode may be a transparent electrode TE, and the second electrode may be a second conductive wire grid pattern layer WG2. The transparent electrode TE and the second conductive wire grid pattern layer WG2 may be electrically connected to each other by an external load Ext. That is, in the display device 1000, the second conductive wire grid pattern layer WG2 not only serves as a polarizer, but also serves as an electrode of the first solar cell SCWGP1.

For example, the transparent electrode TE may be formed of a transparent conductive oxide. For example, the transparent electrode TE may be formed of ITO, IZO, zinc oxide (ZnO), or indium oxide ($In_2O_3$).

For example, the second conductive wire grid pattern layer WG2, like the first conductive wire grid pattern layer WG1, may be formed of any conductive material without limitation. For example, the second conductive wire grid pattern layer WG2 may be formed of a metal. The second conductive wire grid pattern layer WG2 may have a structure in which first partition walls are arranged at regular intervals on the first light-transmissive substrate LS, and may transmit first polarized light therethrough while reflecting second polarized light, which is perpendicular to the first polarized light.

The first and second photoactive layers P1 and P2, which generate excitons by absorbing external light, may contain an electron donor material and an electron acceptor material. That is, the first and second photoactive layers P1 and P2 may be bulk heterojunction (BHJ) layers where the electron donor material and the electron acceptor material are mixed.

The electron donor material may be, for example, poly (3-hexylthiophene) (P3HT), poly[2,1,3-benzothiadiazole-4,7-diyl[4,4-bis(2-ethylhexyl)-4H-cyclopenta[2,1-b:3,4-b']dithiophene-2,6-diyl]] (PCPDTBT), poly[N-9'-heptadecanyl-2,7-carbazole-alt-5,5-(4',7'-di-2-thienyl-2',1',3'-benzothiadiazole)] (PCDTBT), poly[2-methoxy-5-(2-ethylhexyloxy)-1,4-phenylenevinylene] (MEH-PPV), poly (4,4-dioctyldithieno(3,2-b:2',3'-d)silole)-2,6-diyl-alt-(2,1,3-benzothiadiazole)-4,7-diyl) (PSBTBT), poly{4,8-bis[(2-ethylhexyl)oxy]benzo[1,2-b:4,5-b']dithiophene-2,6-diyl-alt-3-fluoro-2-[(2-ethylhexyl)carbonyl]thieno[3,4-b]thiophene-4,6-diyl} (PTB7), or poly{2,6'-4,8-di(5-ethylhexylthienyl) benzo[1,2-b;3,4-b]dithiophene-alt-5-dibutyloctyl-3,6-bis(5-bromothiophen-2-yl)pyrrolo[3,4-c]pyrrole-1,4-dione} (PBDTT-DPP), but the present disclosure is not limited thereto.

The electron acceptor material may be, for example, $C_{60}$, [6,6]-phenyl-$C_{61}$-butyric acid methyl ester ($PC_{60}BM$), or [6,6]-phenyl-$C_{71}$-butyric acid methyl ester ($PC_{70}BM$), but the present disclosure is not limited thereto.

More specifically, the electron donor material may be PBDTT-DPP or PCPDTBT, and the electron acceptor material may be $PC_{60}BM$ or $PC_{70}BM$. If at least one of the first and second photoactive layers P1 and P2 is the mixture of PBDTT-DPP and $PC_{60}BM$, the first solar cell SCWGP1 may prevent the deterioration of the display device 1000 by absorbing ultraviolet (UV) light and infrared (IR) light, and may prevent the degradation of the transmittance of the display device 1000 by transmitting visible light therethrough. Alternatively, if at least one of the first and second photoactive layers P1 and P2 is the mixture of PCPDTBT and $PC_{60}BM$, the first solar cell SCWGP1 may prevent the deterioration of the display device 1000 by absorbing near infrared (NIR) light, and may prevent the degradation of the transmittance of the display device 1000 by transmitting visible light therethrough.

The recombination layer IL, which is a layer in which holes and electrons from the first and second photoactive layer P1 and P2 are recombined, may be disposed between the first and second photoactive layers P1 and P2. The recombination layer IL may be, for example, a single conductive polymer layer, a single metal oxide layer, or a stack of the conductive polymer layer and the metal oxide layer, but the present disclosure is not limited thereto. The conductive polymer layer may be formed of for example, poly(3,4-ethylenedioxythiophene) polystyrene sulfonate (PEDOT:PSS), and the metal oxide layer may be formed of for example, titanium oxide or zinc oxide. However, the present disclosure is not limited to this.

Each of the first and second photoactive layers P1 and P2 may be formed of for example, a non-light-transmissive material and may be a photoactive pattern layer including second partition walls that are spaced from one another. The recombination layer IL may be a recombination pattern layer that is interposed between the photoactive pattern of the first photoactive layer P1 and the photoactive pattern of the second photoactive layer P2 and includes third partition walls that are spaced from one another. Even when the first and second photoactive layers P1 and P2 are formed of a light-transmissive material, the first and second photoactive layers P1 and P2 may also be photoactive pattern layers, and the recombination layer IL may also be a recombination pattern layer. However, when the first and second photoactive layers P1 and P2 are formed of a light-transmissive material, the first and second photoactive layers P1 and P2 and the recombination layer IL may all be formed as slit pattern-less layers to reduce the amount of time required for forming the first and second photoactive layers P1 and P2 and the recombination layer IL.

The overcoat layer OC may be disposed between the transparent electrode TE and the common electrode CE. The overcoat layer OC may fill the slits in the second conductive wire grid pattern layer WG2, the photoactive pattern layers, and the recombination pattern layer. That is, the overcoat layer OC may fill the gaps between the first partition walls, the gaps between the second partition walls, and the gaps between the third partition walls.

The common electrode CE, which is a field-generating electrode, may be formed on the overcoat layer OC using a transparent conductive oxide such as ITO or IZO. A surface of the overcoat layer OC where the common electrode CE is formed may be a planarization layer.

The black matrix BM may be disposed on the second conductive wire grid pattern layer WG2 in the overlapping area with the thin-film transistor TFT.

The liquid crystal layer 300, which rotates the polarization axis of incident light, may include liquid crystal molecules LC having negative dielectric anisotropy, and the liquid crystal molecules LC may be vertically aligned. However, the present disclosure is not limited to this.

The display device 1000 may also include a backlight unit (not illustrated) disposed below the first display substrate 100. The backlight unit may include, for example, a light guide plate (not illustrated), a light source unit (not illustrated), a reflective member (not illustrated), and one or more optical sheets (not illustrated). The display device 1000 may display an image through the second display substrate 200. More specifically, the display device 1000 may output an image through the second light-transmissive substrate US.

FIGS. 5 to 8 are cross-sectional views illustrating the fabrication of the first solar cell SCWGP1 used in the display device 1000 of FIG. 1. Referring to FIGS. 5 to 8, the second conductive wire grid pattern layer WG2, the first and second photoactive layers P1 and P2, and the recombination layer IL may be formed at the same or substantially the same time using nano-imprinting and lithography.

Figure 5:
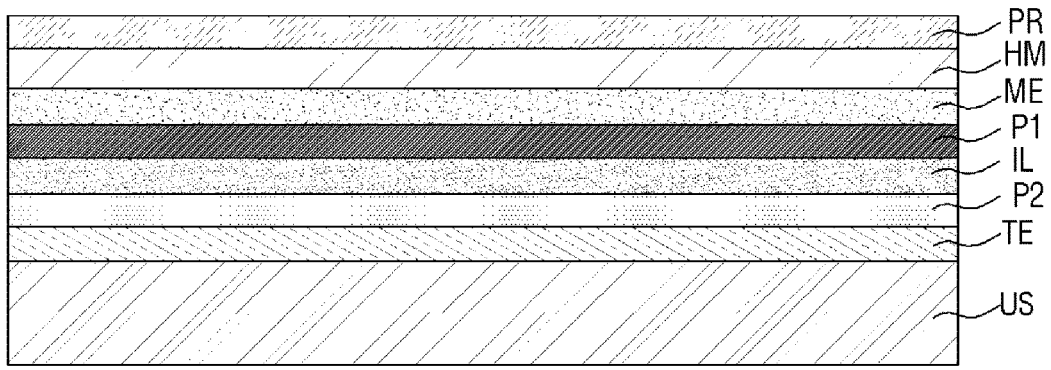
FIGS. 5, 6, 7, and 8 are cross-sectional views illustrating the fabrication of the solar cell used in the display device of FIG. 1.

More specifically, referring to FIG. 5, a mother substrate of the first solar cell SCWGP1 may be fabricated by sequentially depositing the transparent electrode TE, the second photoactive layer P2, the recombination layer IL, the first photoactive layer P1, a metal layer ME, a hard mask layer HM, and a photoresist layer PR on the second light-transmissive substrate US.

Figure 6:
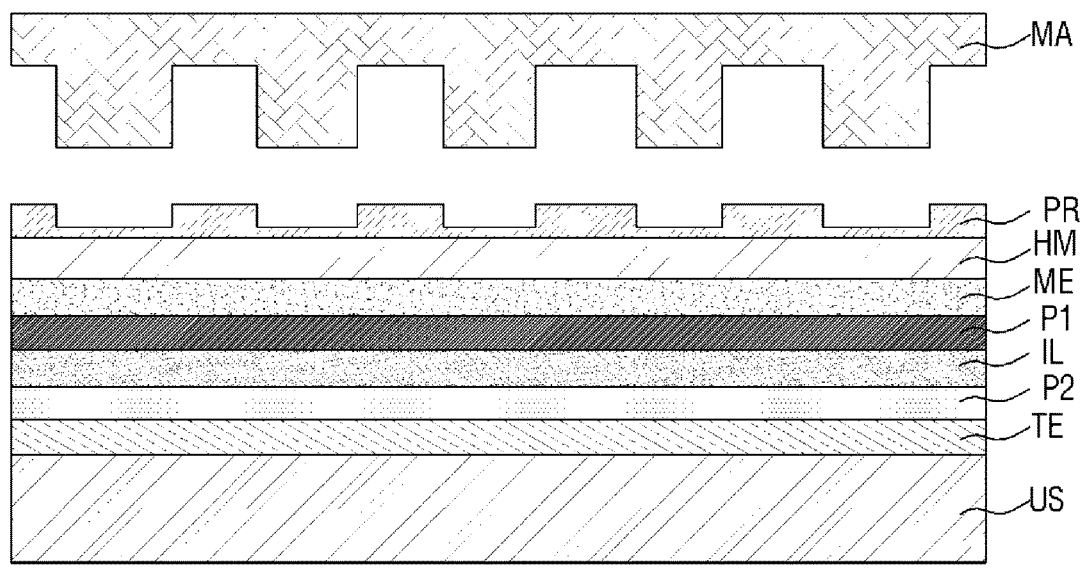
Figure 7:
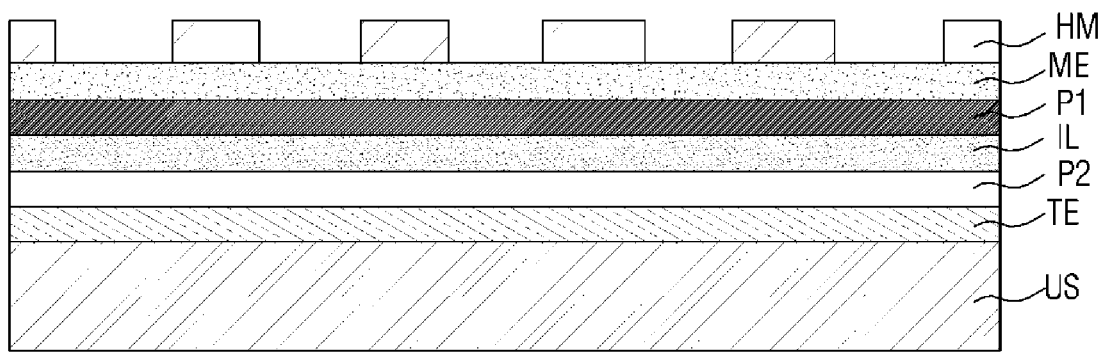

Referring to FIG. 6, the photoresist layer PR may be patterned by using a nano-imprint mold MA as a mask. Referring to FIGS. 6 and 7, the hard mask layer HM may be patterned by using the patterned photoresist layer PR as a mask.

Figure 8:
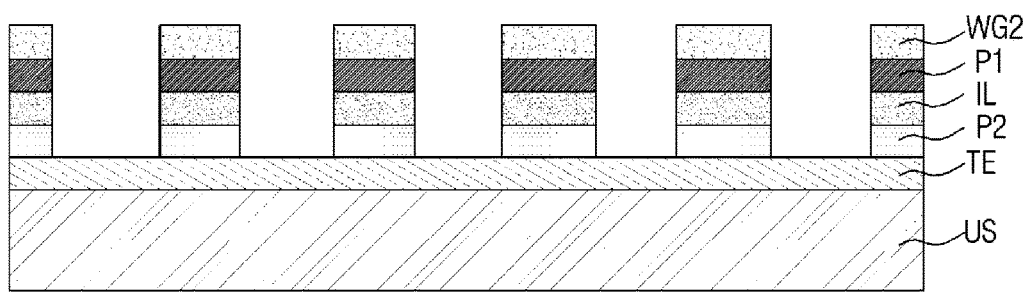

Referring to FIGS. 7 and 8, the metal layer ME, the first photoactive layer P1, the recombination layer IL, and the second photoactive layer P2 may be sequentially patterned by using the patterned hard mask layer HM as a mask. As a result, the first solar cell SCWGP1 may be obtained.

Figure 9:
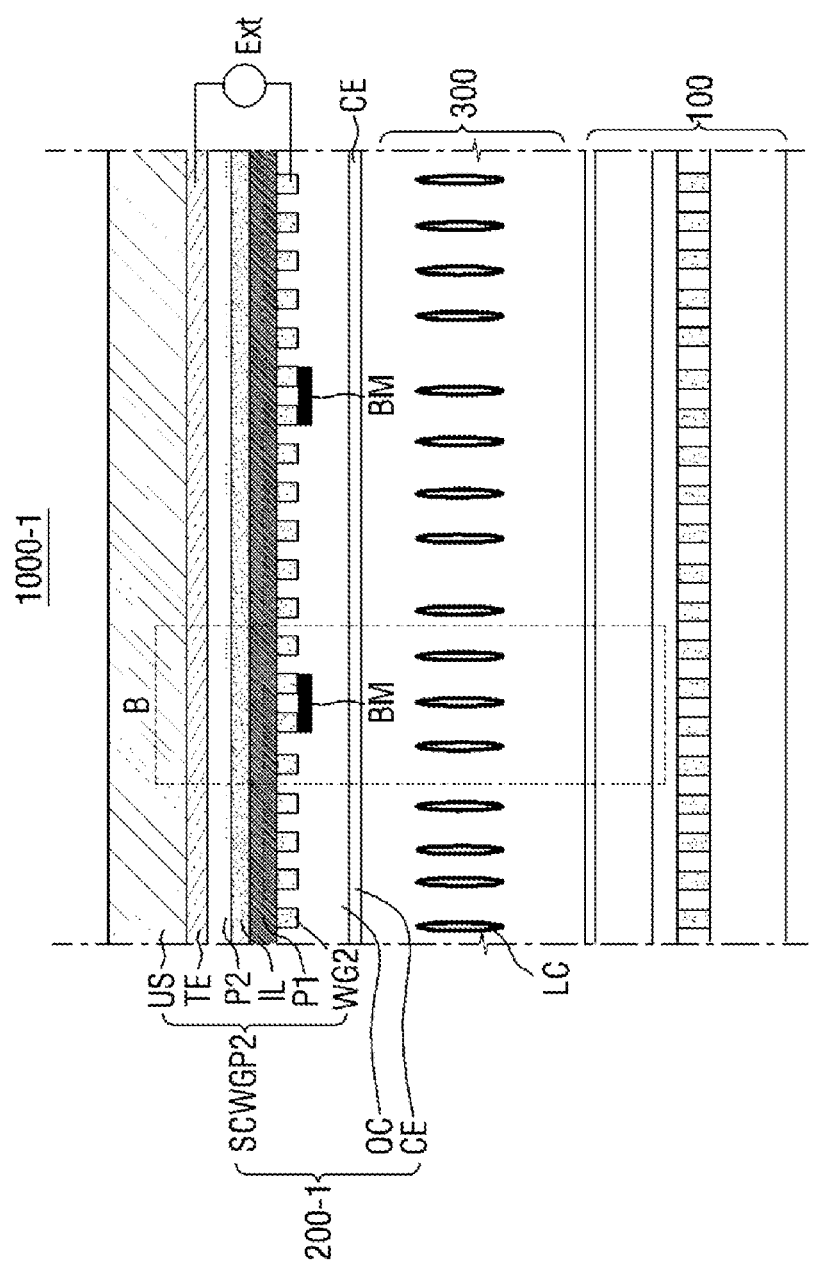
FIG. 9 is a schematic cross-sectional view of a display device according to a second exemplary embodiment of the present disclosure.
Figure 10:
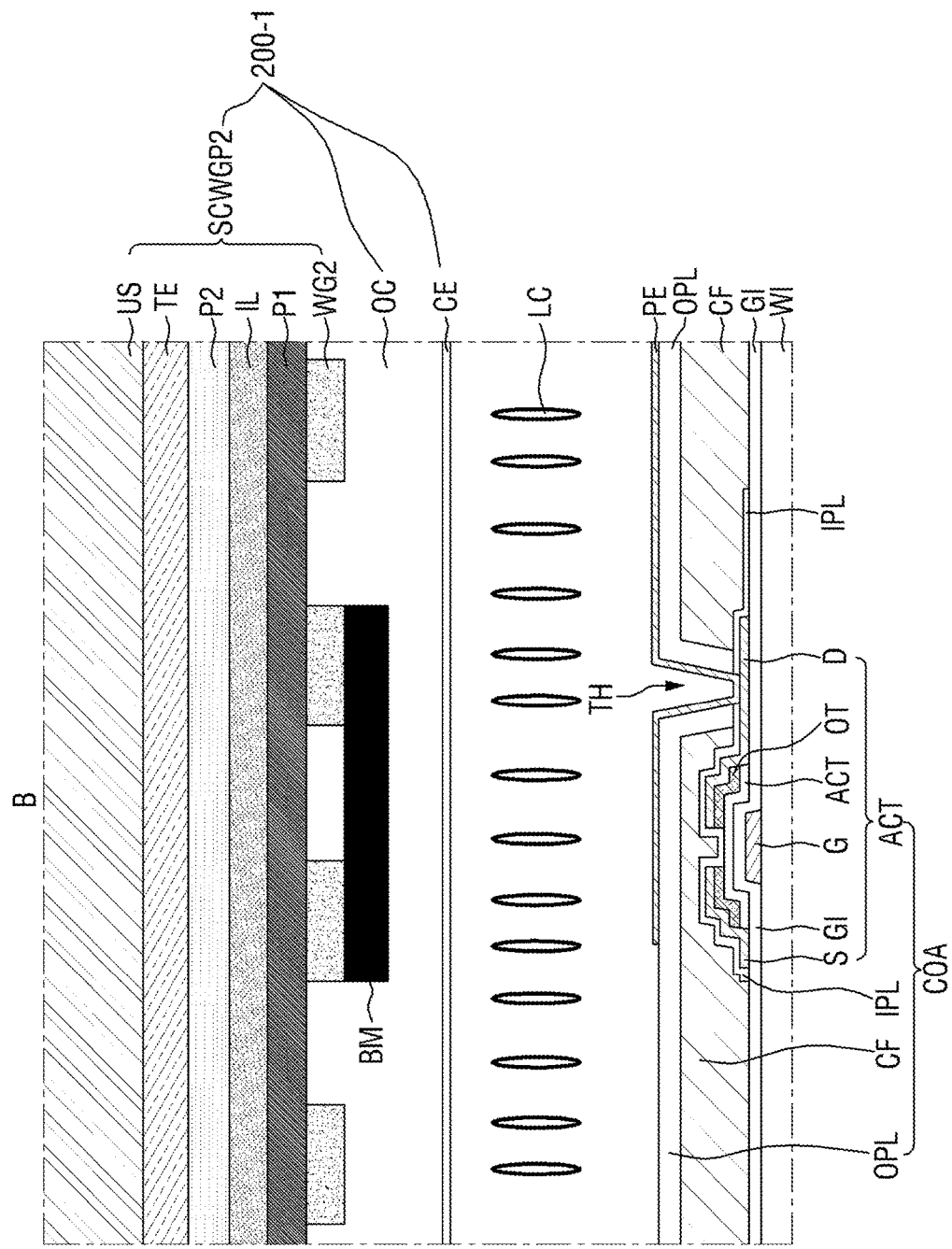
FIG. 10 is an enlarged view of area B of FIG. 9.

FIG. 9 is a schematic cross-sectional view of a display device 1000-1 according to a second exemplary embodiment of the present disclosure. FIG. 10 is an enlarged view of area B of FIG. 9.

Referring to FIGS. 9 and 10, the display device 1000-1 includes a "2-1" display substrate 200-1 and thus differs from the first display device 1000 including the second display substrate 200.

The "2-1" display substrate 200-1 includes a second solar cell SCWGP2 having a first photoactive layer P1, a recombination layer IL, and a second photoactive layer P2, which are all slit pattern-less layers. On the other hand, the second display substrate 200 includes the first solar cell SCWGP1 having the first photoactive layer P1, the recombination layer IL, and the second photoactive layer P2, which are all pattern layers including partition walls spaced from one another and slits between the partition walls.

Each of the first and second photoactive layers P1 and P2 of the second solar cell SCWGP2 may be formed of a light-transmissive material. The "2-1" display substrate 200-1 does not require a process of patterning the first photoactive layer P1, the recombination layer IL, and the second photoactive layer P2 and can thus improve processability and price competitiveness, compared to the second display substrate 200. Accordingly, the display device 1000-1 may have improved processability and price competitiveness, compared to the display device 1000.

Figure 11:
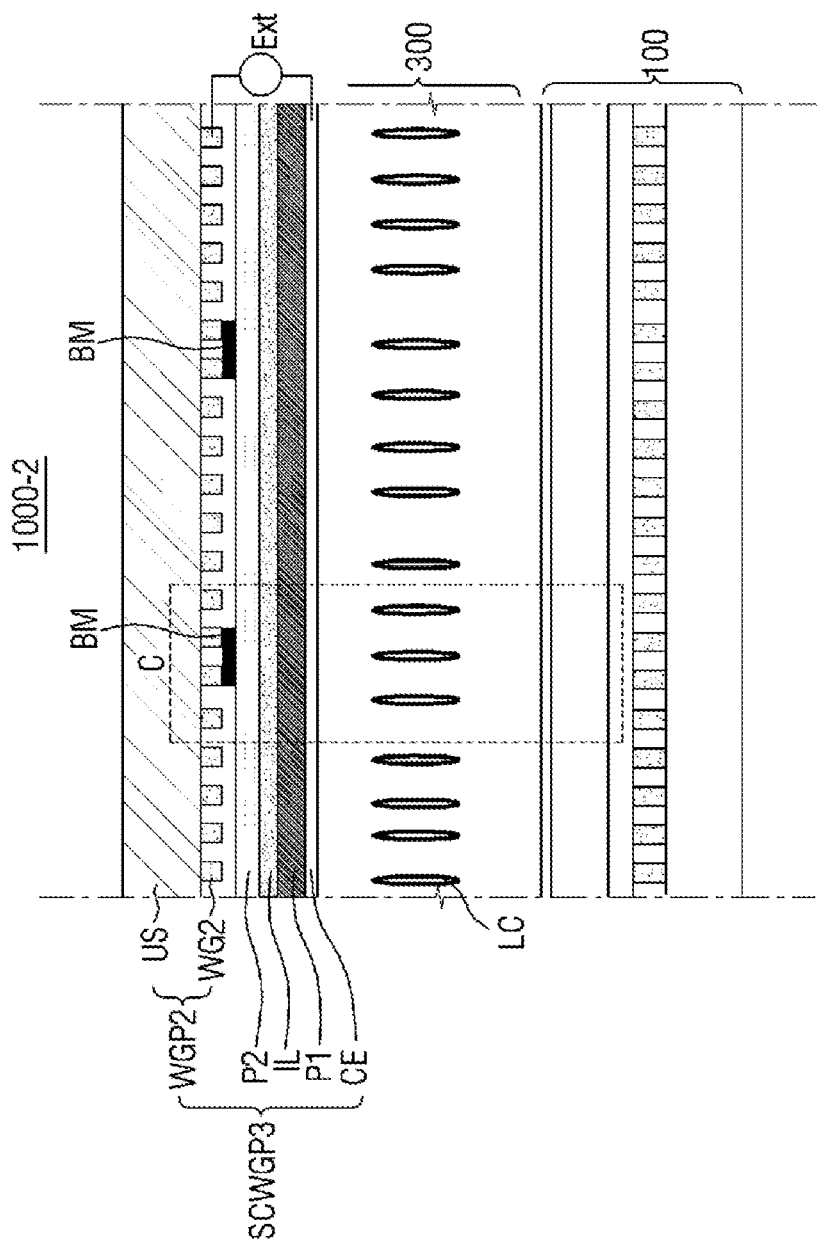
FIG. 11 is a schematic cross-sectional view of a display device according to a third exemplary embodiment of the present disclosure.
Figure 12:
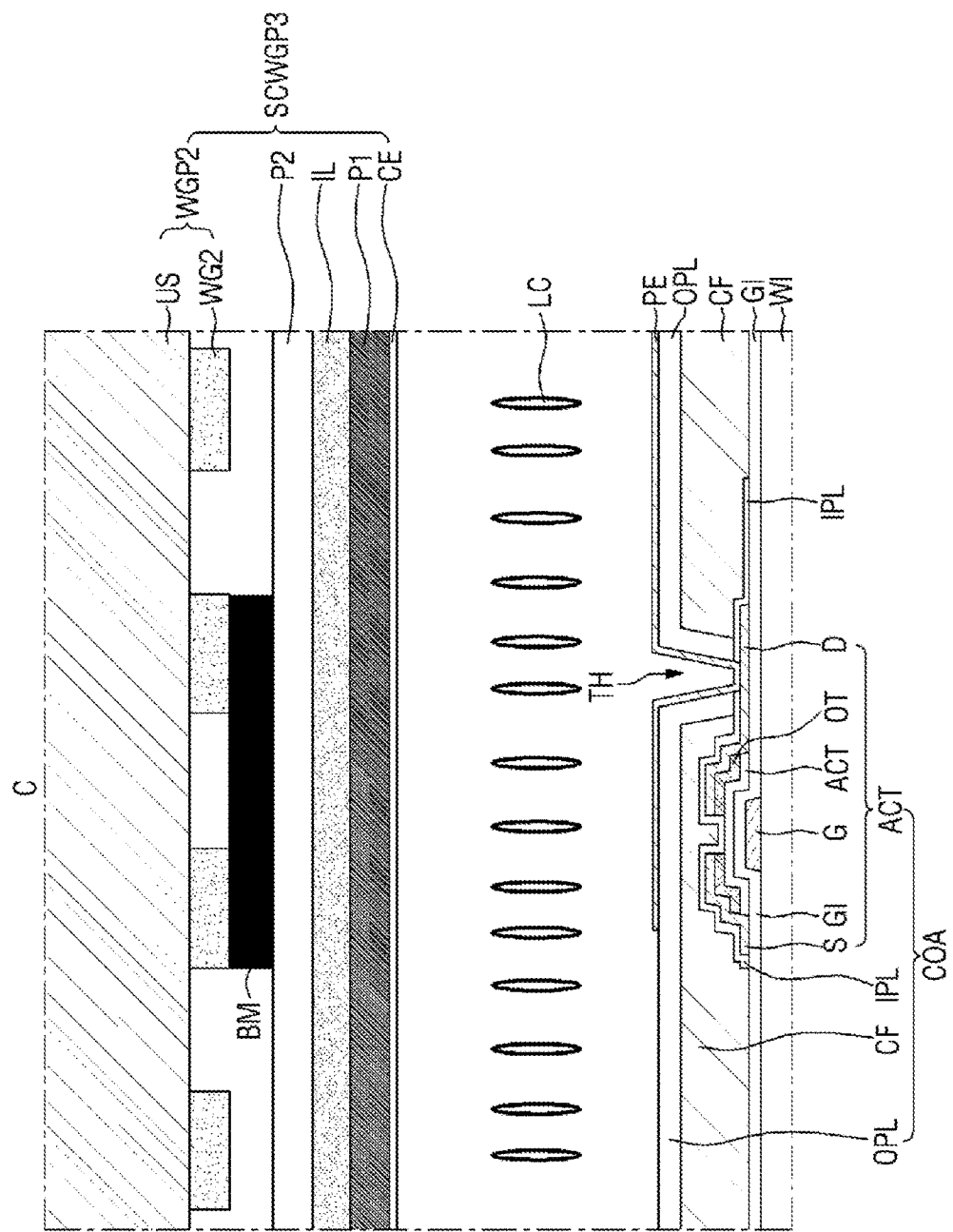
FIG. 12 is an enlarged view of area C of FIG. 11.

FIG. 11 is a schematic cross-sectional view of a display device 1000-2 according to a third exemplary embodiment of the present disclosure. FIG. 12 is an enlarged view of area C of FIG. 11.

The display device 1000-2 differs from the display device 1000-1 in that it has a third solar cell SCWGP3 as an opposite substrate to a first display substrate 100.

The third solar cell SCWGP3 includes a second conductive wire grid polarizer WGP2, first and second photoactive layers P1 and P2, a recombination layer IL, and a common electrode CE. The second conductive wire grid polarizer WGP2 includes a second light-transmissive substrate US and a second conductive wire grid pattern layer WG2, which is disposed on the second light-transmissive substrate US. The third solar cell SCWGP3 differs from the second solar cell SCWGP2 in that it does not have a transparent electrode (such as the transparent electrode TE of FIG. 9) as an electrode but uses the common electrode CE and the second conductive wire grid pattern layer WG2 as electrodes.

The third solar cell SCWGP3 differs from the second solar cell SCWGP2 in that the first and second photoactive layers P1 and P2 and the recombination layer IL are disposed between the second conductive wire grid pattern layer WG2 and the common electrode CE with no overcoat layer OC disposed between the first photoactive layer P1 and the common electrode CE.

The third solar cell SCWGP3 also differs from the second solar cell SCWGP2 in that a black matrix BM is disposed between the second conductive wire pattern layer WG2 and the second photoactive layer P2.

Figure 13:
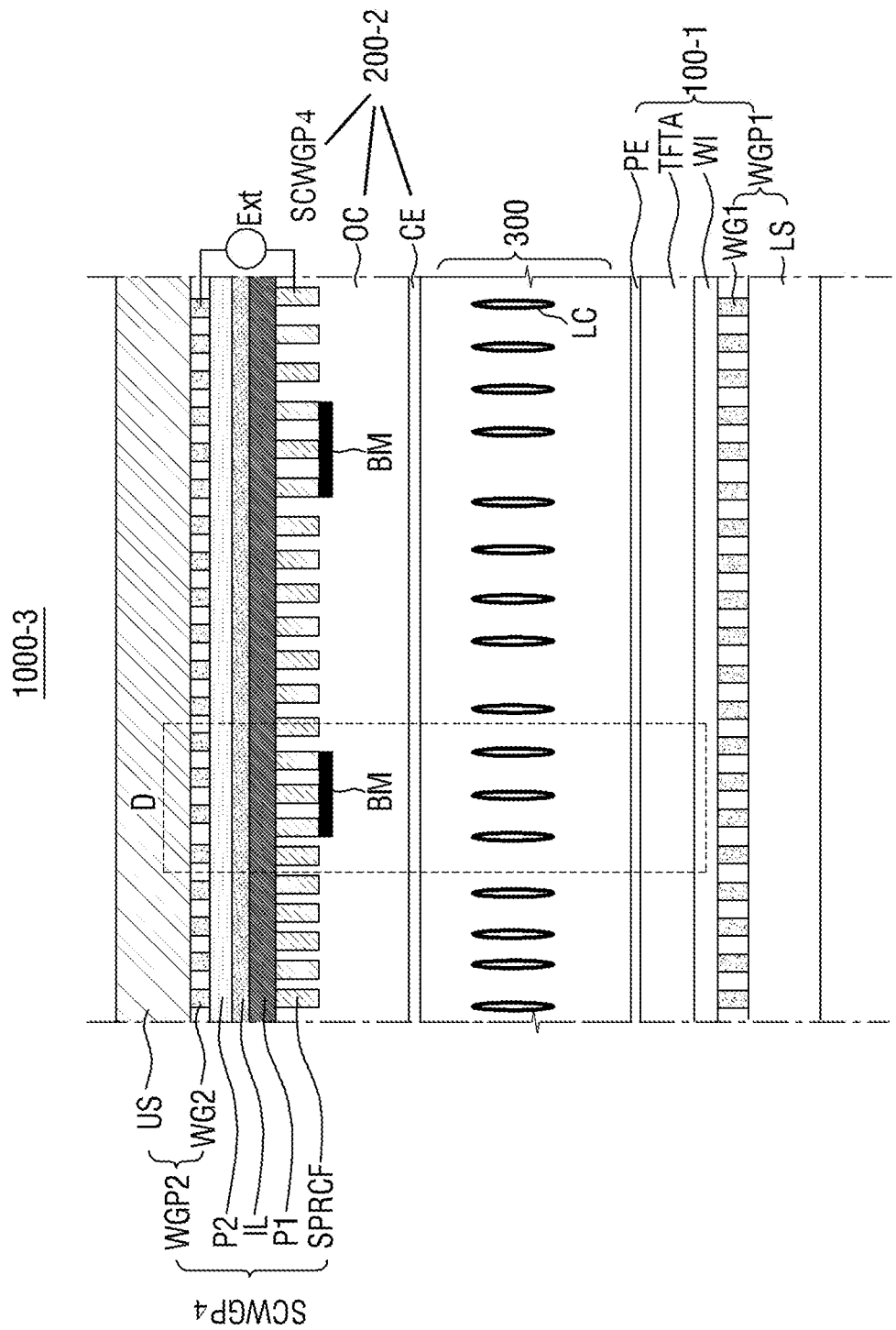
FIG. 13 is a schematic cross-sectional view of a display device according to a fourth exemplary embodiment of the present disclosure.
Figure 14:
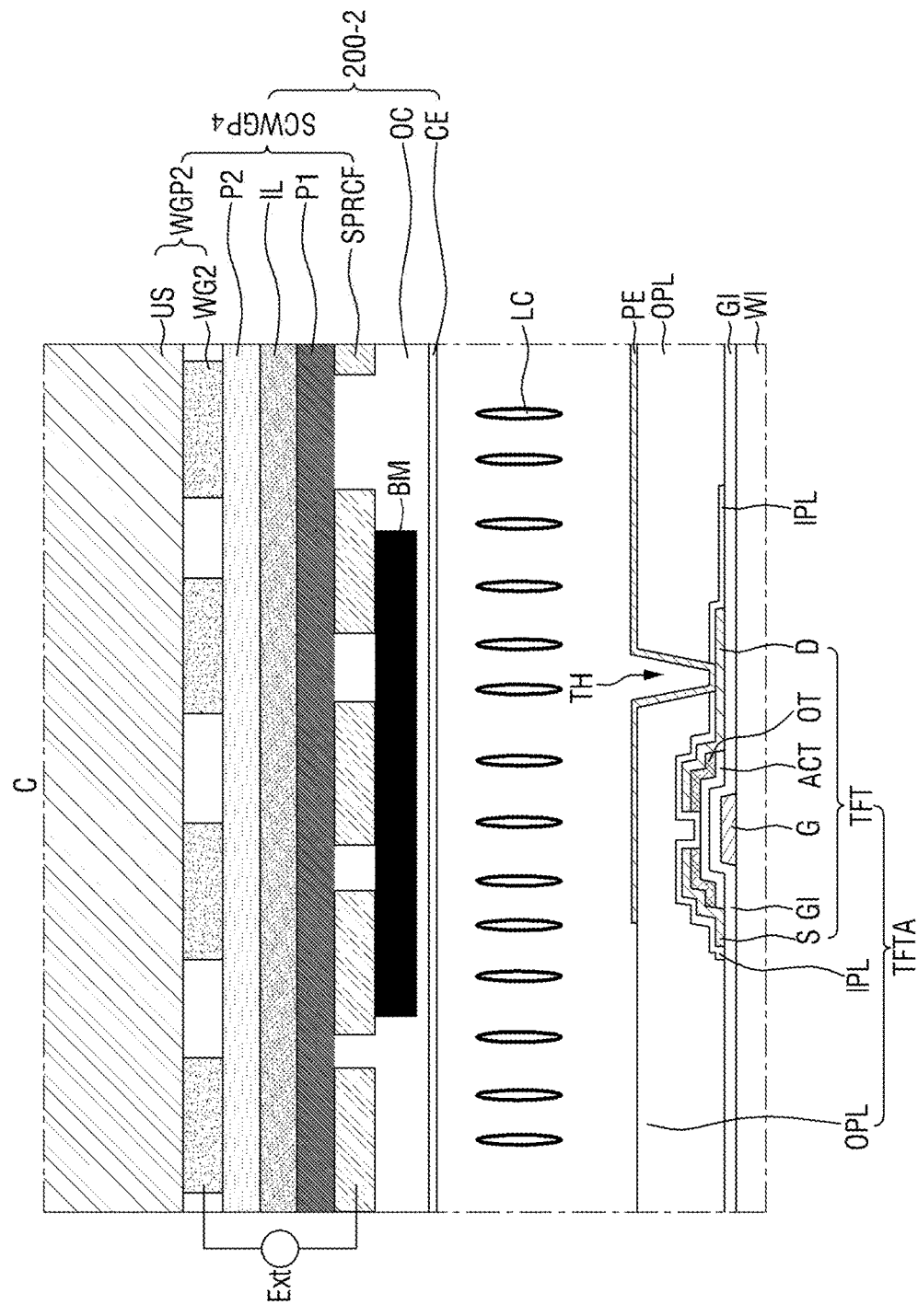
FIG. 14 is an enlarged view of area D of FIG. 13.

FIG. 13 is a schematic cross-sectional view of a display device 1000-3 according to a fourth exemplary embodiment of the present disclosure. FIG. 14 is an enlarged view of area D of FIG. 13.

The display device 1000-3 includes a third display substrate 200-1, which includes a fourth solar cell SCWGP4 and an overcoat layer OC.

The fourth solar cell SCWGP4 differs from the third solar cell SCWGP3 in that a second photoactive layer P2 is disposed on a second conductive wire grid pattern layer WG2, a surface plasmon color filter SPRCF is disposed on a first photoactive layer P1, and a black matrix BM is disposed on the surface plasmon color filter SPRCF.

The fourth solar cell SCWGP4 also differs from the third solar cell SCWGP3 in that the second conductive wire grid pattern layer WG2 and the surface plasmon color filter SPRCF are electrically connected by an external load Ext, whereas in the third solar cell SCWGP3, the second conductive wire grid pattern layer WG2 and the common electrode CE are electrically connected by the external load Ext.

Referring to FIG. 14, the display device 1000-3 differs from the first display device 1000 in that it includes a "1-1" display substrate 100-1 having no color filter, whereas the first display device 1000 includes the first display substrate 100 having the color filter-on-array layer COA. In a switching device array layer TFTA, a thin-film transistor TFT is covered with an organic passivation layer OPL.

Figure 15:
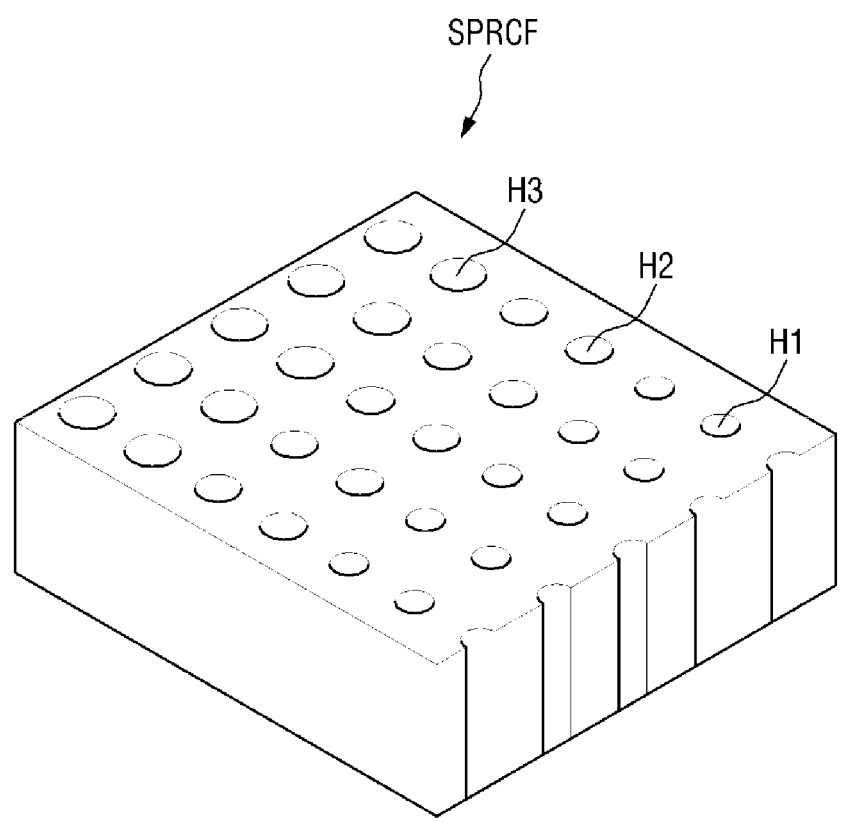
FIG. 15 is a schematic perspective view of a surface plasmon color filter used in the display device of FIG. 13.

FIG. 15 is a schematic perspective view of the surface plasmon color filter SPRCF used in the display device 1000-3 of FIG. 13.

For example, the surface plasmon color filter SPRCF may include a metal thin film layer, which includes hole array patterns consisting of a plurality of nano-size holes H1, a plurality of nano-size holes H2, and a plurality of nano-size holes H3. In response to light being incident upon the surface plasmon color filter SPRCF, the hole array patterns, which have a predetermined period, cause surface plasmon resonance in a particular wavelength range of the incident light.

Surface plasmon resonance is a phenomenon that causes free electrons at the surface of a metal film with periodic nano-size hole patterns to resonate and thus to generate light of a particular wavelength in response to light being incident upon the surface of the metal film. Light of a particular wavelength that can form surface plasmons may be allowed to pass through the holes of the metal film, and the rest of the incident light may be reflected or absorbed by the surface of the metal film.

By using the surface plasmon resonance effect to adjust the period of the patterns of a transmissive film, only desired light may be transmitted through the transmissive film, and as a result, multiple colors may be separated from white light. The light transmitted through the transmissive film may have a wavelength that is about 1.7 to 2 times the lattice period of the transmissive film, i.e., the distance between the patterns of the transmissive film. Accordingly, by adjusting the size and period of the patterns of the transmissive film, desired light can be transmitted through the transmissive film.

The hole array patterns of the metal thin film layer may be formed not only in a circular shape, but also in various other shapes such as oval, rectangular, triangular, and slit shapes. The sizes (or diameters) of the holes H1, the holes H2, and the holes H3 may be in the range of about 100 nm to 300 nm, and the distances between the holes H1, between the holes H2, and between the holes H3 may be in the range of about 300 nm to about 700 nm.

For example, to allow the transmission of blue light having a wavelength of 436 nm, the size of and the distance between, the holes H1 may be set to 300 nm and 155 nm, respectively. To allow the transmission of green light having a wavelength of 538 nm, the size of and the distance between, the holes H2 may be set to 450 nm and 180 nm, respectively. To allow the transmission of green light having a wavelength of 627 nm, the size of and the distance between, the holes H3 may be set to 550 nm and 225 nm, respectively.

The metal thin film layer may be formed of for example, one of Al, gold (Au), Ag, and Cu, but the present disclosure is not limited thereto.

While the present disclosure has been particularly shown and described with reference to exemplary embodiments thereof, it will be understood by those of ordinary skill in the art that various changes in implementation and detail may be made therein without departing from the spirit and scope of the following claims. The exemplary embodiments should be considered in a descriptive sense only and not for purposes of limitation.

What is claimed is:

1. A display device, comprising:
a first light-transmissive substrate;
a second light-transmissive substrate; and
a solar cell disposed between the first and second light-transmissive substrates, wherein the solar cell includes:
a conductive wire grid polarizer disposed between the first and second light-transmissive substrates,
a surface plasmon color filter disposed between the first light-transmissive substrate and the conductive wire grid polarizer, wherein the conductive wire grid pattern layer is electrically connected to the surface plasmon color filter, and
at least one photoactive layer disposed between the surface plasmon color filter and the conductive wire grid polarizer,
wherein the second light-transmissive substrate is configured to output an image therethrough.

2. The display device of claim 1, wherein the conductive wire grid polarizer includes a conductive wire grid pattern layer having first partition walls, which are spaced from one another, and is configured to transmit a first polarized light therethrough while reflecting a second polarized light, that is perpendicular to the first polarized light.

3. The display device of claim 1, wherein the photoactive layer is formed of a light-transmissive material and is a slit pattern-less layer.

4. The display device of claim 1, wherein the photoactive layer transmits visible light therethrough and absorbs UV light and IR light.

5. The display device of claim 1, wherein the solar cell is a tandem polymer solar cell including two or more photoactive layers and one or more recombination layers, which are disposed between the two or more photoactive layers.

6. The display device of claim 1, wherein the surface plasmon color filter includes hole array patterns and the hole array patterns include first holes, which are configured to transmit light in a blue wavelength range therethrough, second holes, which are larger in size than the first holes and configured to transmit light in a green wavelength range, and third holes, which are larger in size than the second holes and configured to transmit light in a red wavelength range.

7. A display device, comprising:
a first light-transmissive substrate;
a second light-transmissive substrate configured to output an image therethrough; and
a solar cell disposed between the first and second light-transmissive substrates, wherein the solar cell includes:
a conductive wire grid polarizer disposed between the first and second light-transmissive substrates,
a surface plasmon color filter disposed between the first light-transmissive substrate and the conductive wire grid polarizer, wherein the surface plasmon color filter includes hole array patterns and the hole array patterns include first holes, which are configured to transmit light in a blue wavelength range therethrough, second holes, which are larger in size than the first holes and configured to transmit light in a green wavelength range, and third holes, which are larger in size than the second holes and configured to transmit light in a red wavelength range, and
at least one photoactive layer disposed between the surface plasmon color filter and the conductive wire grid polarizer,
a liquid crystal layer disposed between the first light-transmissive substrate and the surface plasmon color filter;

a common electrode disposed between the surface plasmon color filter and the liquid crystal layer; and an overcoat layer disposed between the photoactive layer and the common electrode to fill the first holes, the second holes, and the third holes.

* * * * *